United States Patent [19]

Sam et al.

[11] Patent Number: 4,786,702

[45] Date of Patent: Nov. 22, 1988

[54] CURABLE SILICONE COMPOSITION

[75] Inventors: Huy Sam; Yasuji Matsumoto, both of Ohta, Japan

[73] Assignee: Toshiba Silicone Co., Ltd, Japan

[21] Appl. No.: 87,581

[22] Filed: Aug. 20, 1987

[30] Foreign Application Priority Data

Aug. 27, 1986 [JP] Japan .............................. 61-198926

[51] Int. Cl.$^4$ ............................................. C08G 77/06
[52] U.S. Cl. ........................................ 528/15; 528/31; 528/32; 528/21; 528/22; 525/478; 427/387; 427/388.1; 428/447; 428/450
[58] Field of Search ...................... 528/15, 31, 21, 32, 528/22; 525/478

[56] References Cited

U.S. PATENT DOCUMENTS

| | | | |
|---|---|---|---|
| 3,188,299 | 6/1965 | Chalk | 528/32 |
| 3,453,233 | 7/1969 | Flatt | 528/32 |
| 3,723,567 | 3/1973 | Mink et al. | 528/32 |
| 4,239,867 | 12/1980 | Legrow et al. | 528/21 |
| 4,588,800 | 5/1986 | Palensky et al. | 528/15 |
| 4,605,722 | 8/1986 | Suzuki | 528/15 |

Primary Examiner—Melvyn I. Marquis

[57] ABSTRACT

A curable silicone composition which is characterized by comprising:
(A) a polyorganosiloxane containing alkenyl groups attached to silicon atoms in the molecule;
(B) a polyorganosiloxane containing hydrogen atoms attached to silicon atoms in the molecule;
(C) a catalytic amount of curing catalyst; and
(D) an amine compound represented by the formula:

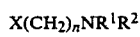

$$X(CH_2)_nNR^1R^2$$

wherein X represents a substituted or unsusbtituted monovalent hydrocarbon group or a monovalent group represented by $Z_3SiQ^1$ in which $Q^1$ represents a substituted or unsusbtituted divalent hydrocarbon group and Z represents a substituted or unsubstituted monovalent hydrocarbon group or an alkoxy group with 1 to 4 carbon atoms, n represents an integer of 0 to 5, $R^1$ represents a substituted or unsubstituted alkyl group with 1 to 10 carbon atoms or a hydrogen atom, and $R^2$ represents a substituted or unsubstituted alkyl group with 1 to 10 carbon atoms or a monovalent group represented by $Z_3SiQ^1$.

12 Claims, No Drawings

CURABLE SILICONE COMPOSITION

The present application claims the priority of Japanese patent application Ser. No. 61-198926 filed on Aug. 27, 1986.

BACKGROUND OF THE INVENTION

The present invention relates to a curable silicone composition, and more specifically, it relates to an addition reaction type curable silicone composition which can cure even in the presence of a substance which inhibits curing.

Silicones have excellent properties such as electrical insulating properties, heat resistance, moisture resistance etc. Thus, silicones find a wide range of applications as coating agents, potting agents, etc., in electric and electronic fields and also fields of optics, optoelectronics, sensors, etc. Silicone comositions which cure by addition reaction have enjoyed an increased number of applications in these fields because they rapidly cure at room temperature and because they do not discharge corrosive substances upon such curing reaction.

On coating or potting parts with silicone, organic adhesives, such as instantaneous adhesives, e.g. cyanoacryl type, etc., or UV-cure adhesives such as acrylic, polyurethane, epoxy types etc. are used for the purpose of temporarily fixing the parts. In such a case, organic adhesives of these types often come into contact with the addition reaction type silicone composition and, as a result, cause problems with curing inhibition of the silicone composition as well as with reduction in hardness of the cured product, etc.

Heretofore, as countermeasures against such problems, there have been practiced, for example, a method which comprises removing the adhesives with a solvent a method which comprises increasing the curing speed by raising the temperature or increasing the amount of catalyst, e.g. platinum type, for the addition reaction, etc. However, the method which comprises removing the adhesive with a solvent has problems of not only increasing the number of steps in question but also of solvent handling and complete removal thereof from the part, etc. Moreover, depending on the parts, the dimensional stability of the parts, etc. can be adversely affected due to the solvent or the operations of removing said solvent. The method which comprises raising the temperature has a problem that the substrates of the parts are adversely influenced when heated to e.g. about 150° C. Further, with the method which comprises increasing the amount of a catalyst, a substantial amount must be incorporated to obtain the desired effect against curing inhibition and the incorporation of such an amount exerts an adverse influence on the electrical characteristics.

SUMMARY OF THE INVENTION

An object of the present invention is to provide an addition reaction type curable silicone composition which does not suffer from the above-described curing insufficiency in the presence of such organic adhesives.

The present inventors have intensively studied in clear to obtain such a composition, and, as a result, have discovered that by incorporating an amine compound of specific structure into an addition reaction type curable silicone composition, the composition cures favorably even in the presence of the above-described adhesives.

DETAILED DESCRIPTION OF THE INVENTION

The present invention is a curable silicone composition which comprises:

(A) a polyorganosiloxane containing alkenyl groups attached to silicon atoms in the molecule;

(B) a polyorganosiloxane containing hydrogen atoms attached to silicon atoms in the molecule;

(C) a catalytic amount of curing catalyst; and (D) an amine compound represented by the formula:

$$X(CH_2)_nNR^1R^2$$

wherein X represents a substituted or unsubstituted monovalent hydrocarbon group or a monovalent group represented by $Z_3SiQ^1$ in which $Q^1$ represnts a substituted or unsubstituted divalent hydrocarbon group and Z represents a substituted or unsubstituted monovalent hydrocarbon group or an alkoxy group with 1 to 4 carbon atoms, n represents an integer of 0 to 5, $R^1$ represents a substituted or unsubstituted alkyl group with 1 to 10 carbon atoms or a hydrogen atom, and $R^2$ represents a substituted or unsubstituted alkyl group with 1 to 10 carbon atoms or a monovalent group represented by $Z_3SiQ^1$.

The polyorganosiloxane in component (A) is that which contains alkenyl groups directly attached to the silicon atoms in the molecule and which serves as a base polymer or a crosslinking agent in the curable silicone composition. The alkenyl group may be exemplified by vinyl group, allyl group, 1-butenyl group, 2-hexenyl group etc., and of those, the vinyl group is most preferred because of the ease of the polyorganosiloxane synthesis. Further, organic groups other than alkenyl groups attached to the silicon atoms in the molecule of such a polyorganosiloxane may be exemplified by alkyl groups such as methyl group, ethyl group, propyl group, butyl group, hexyl group, dodecyl group etc.; aryl groups such as phenyl group, tolyl group, xylyl group, naphthyl group etc.; aralkyl groups such as benzyl group, β-phenylethyl group, β-phenylpropyl group, naphthylmethyl group and so forth. In addition, the organic group may be exemplified by substituted hydrocarbon groups such as chloromethyl group, 3,3,3-trifluoropropyl group, chlorophenyl group etc. In view of ease of synthesis of component (A) and good physical properties of the composition after curing, it is preferred that 90 mole % or more of the organic groups other than the alkenyl groups are methyl groups. Further where the cured product is required to be heat resistant and low-temperature resistant, it is preferred that of the organic groups other than the alkenyl groups, 5 to 10 mole % are phenyl groups.

The structure of this polyorganosiloxane may be selected depending on the state of the composition after curing, that is, whether it is a gel-like material, a rubbery elastomeric material or a resinous solid. Thus, depending on the desired state, the content of alkenyl groups, the degree of polymerization or the structure, i.e. whether straight-chain, branched-chain, resinous or the like may be chosen.

The polyorganosiloxane in component (B) is that which forms a cured product by addition reaction with the alkenyl groups attached to the silicon atoms of polyorganosiloxane (A). The polyorganosiloxane in component (B) contains hydrogen atoms attached to silicon atoms in the molecule and acts as a crosslinking agent where component (A) is a base polymer or as a base polymer where component (A) is a crosslinking agent. The organic groups directly attached to the silicon atom in the molecule of this polyorganosiloxane may be exemplified by alkyl groups such as methyl group, ethyl group, propyl group, butyl group, hexyl group, dodecyl group etc.; aryl groups such as phenyl group, tolyl group, xylyl group, naphthyl group etc.; aralkyl groups such as benzyl group, 3-phenylethyl group, 3-phenylpropylgroup, naphthylmethyl group and so forth. In addition, the organic group may also be exemplified by substituted hydrocarbon groups such as chloromethyl group, 3,3,3-trifluoropropyl group, chlorophenyl group etc. It is preferred that 90 mole % or more of the organic groups other than alkenyl groups are methyl groups in view of the ease of synthesis and the retention of the physical properties after curing. Furthermore, where the cured product is required to be heat resistant and low temperature resistant, it is preferred that 5 to 10 mole % of the organic groups other than alkenyl groups are phenyl groups.

The structure and the number of the hydrogen atoms attached to silicon atoms of the polyorganosiloxane of component (B) are not particularly restricted. In order to carry out an appropriate addition retention, it is common to use component (B) in such amount that the number of hydrogen atoms of the polyorganosiloxane is 0.1 to 10 per alkenyl group in the polyorganosiloxane of component (A).

The curing catalyst in component (C) is that which promotes the addition reaction between the alkenyl groups in component (A) and the hydrogen atoms in component (B). Examples of component (C) include platinum or platinum compound catalysts exemplified by chloroplatinic acid, a complex of an alcohol and chloroplatinic acid, a complex of platinum and an olefin, a complex of platinum and a ketone, a complex of platinum and a vinylsiloxane etc.; palladium or palladium compound catalysts exemplified by tetrakis(triphenylphosphine)palladium, a mixture of palladium black and triphenylphosphine etc.; or rhodium or rhodium compound catalysts. Among these platinum or platinum compound catalysts are preferred because of their catalytic effect and ease of handling. The amount of component (C) is preferably 1 to 500 ppm taken as the amount of the catalyst metal element based on the total amount of components (A) and (B). If the amount of the catalyst is too small, the addition reaction becomes slow, whereas if it is too much, the heat resistance is adversely affected.

The amine compound in component (D) is that which prevents cure inhibition of the addition reaction type curable silicone composition, caused by the above-described acryl, polyurethane and epoxy or the like adhesives. The amine compound provides good cure even if the composition contacts with such adhesives or such adhesives happen to be incorporated into the composition. Component (D) is the characteristic component in the present invention.

This amine compound has a special chemical structure and is represented by the formula:

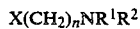

wherein X, n, $R^1$ and $R^2$ are as defined above. X may be exemplified by alkyl groups such as methyl group, ethyl group, propyl group, butyl group, hexyl group, dodecyl group etc.; cycloalkyl groups such as cyclohexyl group; aryl groups such as phenyl group, tolyl group, xylyl group, naphthyl group etc.; aralkyl groups such as benzyl group, β-phenylethyl group, β-phenylpropyl group, naphthylmethyl group etc.; alkenyl groups such as vinyl group, allyl group, 1-butenyl group, 2-hexenyl group, etc., and in addition may also be exemplified by substituted hydrocarbon groups such as chloromethyl group, 3,3,3-trifluoropropyl group, chlorophenyl group etc. Furthermore X may be silicon-containing groups represented by $Z_3SiQ^1$ wherein $Q^1$ and Z are as defined above, e.g.:

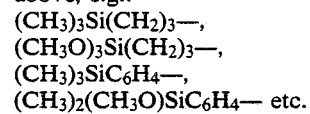
$(CH_3)_2(CH_3O)SiC_6H_4$— etc.

To reduce the chance of poisoning catalyst (C) and to prevent the inhibition of the curing reaction due to the above-described adhesives, it is preferable that X be selected from the alkyl groups with 8 or more carbon atoms, the cycloalkyl groups with 6 or more carbon atoms, the aryl groups, the aralkyl groups, the substituted hydrocarbon groups of these hydrocarbon groups and the group represented by $Z_3SiQ^2$ wherein Z is as defined above and $Q^2$ represents alkenyl group with 8 or more carbon atoms, cycloalkylene group with 6 or more carbon atoms, arylene group or a divalent substituted hydrocarbon group thereof.

$R^1$ may be exemplified by a hydrogen atom; alkyl groups with 1 to 10 carbon atoms such as methyl group, ethyl group, propyl group, butyl group, hexyl group, cyclohexyl group etc.; and substituted hydrocarbon groups thereof. Among these in view of the compatibility of the amine compound in the composition, it is preferably hydrogen atom, methyl group or ethyl group. $R^2$ may be exemplified by a group represented by $Z_3SiQ^1$ in addition to the alkyl groups and substituted hydrocarbon groups thereof already mentioned for $R^1$. For similar reasons to $R^1$, $R^2$ is preferably methyl group, ethyl group or the group represented by $Z_3SiQ^2$. Examples of suitable amine compounds include: N,N-dimethylaniline, N,N-diethylaniline, N-methylaniline, N-ethylaniline, N,N-dimethylbenzylamine, N-methylbenzylamine, N,N-dimethylcyclohexylamine, N,N-dimethylhexadecylamine, N,N-dimethyl-p-nitroaniline,
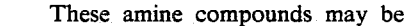
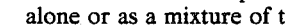
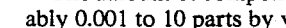
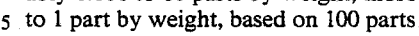

These amine compounds may be employed either alone or as a mixture of two or more of these.

The amount of component (D) incorporated is preferably 0.001 to 10 parts by weight, more preferably 0.001 to 1 part by weight, based on 100 parts by weight of the total amount of the components (A) and (B).

The composition of the present invention may be stored in a single package either by incorporating a reaction inhibitor, for example, an acetylene group-containing organic compound, or by employing a platinumor platinum compound catalyst which is not greatly active at room temperature. Alternatively, they may be stored separately, i.e., a mixture of the components (A), (B) and (D) may be stored as a first package while the component (C) may be stored as a second package; or a mixture of the components (B), (D) and a part of component (A) may be packed in a first package while a mixture of component (C) and the rest of component (A) may be stored in a second package. Later, upon use, these contents in the packages may be uniformly mixed and defoamed under reduced pressure.

The composition of the present invention may be appropriately modified to adjust the processability, the hardness after curing, the mechanical strength, etc., by adding inorganic fillers as needed. Such inorganic fillers may be exemplified by fumed silica, silica aerogel and precipitated silica. Further, it is also possible to add solvents, such as toluene and hexane; viscosity modifiers, such as polydimethylsiloxane; auxiliary base polymers, such as alkenyl group-containing polysiloxane; and curing inhibitors, such as acetylene group-containing alcohol or a reaction product of such alcohol with a polysiloxane; in amounts which do not deteriorate the effect of the present invention.

By use of the composition of the present invention, good cure may be maintained even if the composition contacts with various organic adhesives or even if these adhesives happen to be incorporated into the composition. For that reason, the reliability may be extremely enhanced by using them as coating agents, potting agents in electric and electonic fields and fields of optics, optoelectronics and sensors.

EXAMPLES OF THE INVENTION

The present invention is illustrated by the following examples. In the examples, all the parts mean parts by weight.

EXAMPLE 1

To 100 parts of a polymethylvinylsiloxane, containing 0.053 mmole/g of vinyl groups and having a viscosity at 25° C. of 650 cP, were added a complex obtained by heating chloroplatinic acid and tetramethyltetravinylcyclotetrasiloxane in an amount of 4 ppm calculated as platinum atom and 0.005 part of 3-methyl-1-butyn-3-ol. The resultant composition was mixed until homogeneous. Thereafter, 0.44 part of a polymethylhydrogensiloxane containing 8.82 mmole/g of hydrogen atoms attached to the silicon atoms and having a viscosity at 25° C. of 40 cP was added thereto and mixed to obtain an addition reaction type silicone composition C-11. Silicone composition C-11 was devided into samples of 100 parts, to which were added 0.01 part of the amine compounds set forth in Table 1 respectively to obtain compositions of the present invention A-11 to A-15 respectively.

To 100 part portions of C-11 and A-11 through A-15, were added 1 part or 5 part portions respectively of an instantaneous adhesive Aronalpha 201 (cyanoacrylic type, trade name, produced by Toa Gosei Chemical Industry). Curing was allowed to proceed under conditions of 150° C. for one hour, and cone penetration was measured for the composition (according to ASTM D-1403, ¼ cone). The results are shown in Table 1. It should be noted that the composition C-11 is a comparative composition which does not contain the amine compound. In the Table, the greater the cone penetration, the softer the composition. The composition of the comparative example shows curing inhibition.

TABLE 1

| Composition | C-11 Comparative Example | A-11 | A-12 | A-13 | A-14 | A-15 |
|---|---|---|---|---|---|---|
| Amine Compound Incorporated | — | N,N—Dimethyl-aniline | N,N—Diethyl-aniline | N—Methyl-aniline amine | N,N—Dimethyl-hexadecyl $N(CH_3)_2$ | $(CH_3)_3$—$SiC_6H_4$—$N(CH_3)_2$ |
| Cone Penetration | | | | | | |
| Aronalpha 201 Not Added | 120 | 119 | 120 | 119 | 120 | 120 |
| Aronalpha 201 1 Part Added | 169 | 122 | 122 | 122 | 123 | 123 |
| Aronalpha 201 5 Parts Added | Too great to measure | 126 | 127 | 126 | 128 | 127 |

EXAMPLE 2

100 parts of a polymethylvinylsiloxane, containing 0.20 mmole/g of vinyl groups and having a viscosity at 25° C. of 350 cP, were mixed fully with 4 parts of a polymethylhydrogensiloxane, having 8.9 mmole/g of hydrogen atoms attached to the silicon atoms and a viscosity at 250° C. of 40 cP, and 50 parts of quartz powder having an average particle diameter of 2 μm. The resultant mixture was divided into samples of 154 parts to which were added as shown in Table 2 a solution of chloroplatinic acid in isopropyl alcohol in amounts of 5, 20 and 50 ppm calculated as platinum atom respectively. The samples were mixed to obtain addition reaction type silicone compositions C-21 to C-23 respectively. Further, to 100 part portions of C-21 were added 0.005 part and 0.01 part portions of N,N-dimethylaniline respectively to obtain the compositions A-21 and A-22 of the present invention.

To 100 part portions of C-21 to C-23 and A-21 and A-22 were mixed 2 parts and 6 parts of Arontight AX (acrylic ultraviolet curable adhesive, produced by Toa Gosei Chemical Industry), after which samples were poured into dried aluminum cups to a thickness of 6 mm, and heated at 60° C. for 5 hours to cure. They were allowed to stand at room temperature for 24 hours, and their hardness was measured by JIS hardness meter (JIS A). The results are shown in Table 2.

TABLE 2

| | Comparative Example | | | Present Invention (Units) | |
|---|---|---|---|---|---|
| Composition | C-21 | C-22 | C-23 | A-21 | A-22 |
| Amount of Platinum Catalyst Added (ppm) | 5 | 20 | 50 | 5 | 5 |
| Amount of N,N—Dimethylaniline Added (Parts) | — | — | — | 0.005 | 0.01 |
| Hardness (JIS A) | | | | | |
| Adhesive Not Added | 40 | 40 | 40 | 40 | 40 |
| Adhesive 2 Parts Added | 12 | 19 | 24 | 40 | 40 |
| Adhesive 6 Parts Added | Not Cured | 10 | 15 | 40 | 40 |

EXAMPLE 3

100 parts of a polymethylvinylsiloxane, containing 0.075 mmole/g of vinyl groups and having a viscosity at 25° C. of 3000 cP, were mixed thoroughly with 2 parts of a polymethylhydrogensiloxane, containing 9.18 mmole/g of hydrogen atoms attached to the silicon atoms and having a viscosity at 25° C. of 40 cP, 3 parts of adhesion promoter represented by the following formula:

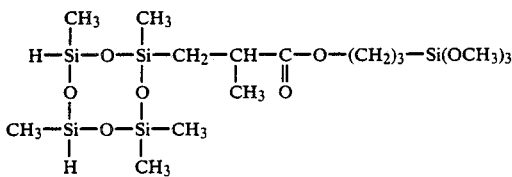

150 parts of quartz powder having an average particle diameter of 5 μm, 2 parts of titanium oxide powder and 0.01 part, calculated as platinum atom, of complex of chloroplatinic acid and octanoic acid, to obtain an addition reaction type silicone composition C-30. To 100 parts of this composition C-30, was added 0.01 part of N,N-dimethylcyclohexylamine and mixed enough to obtain a composition of the present invention, A-30.

In order to test the compositions, the bottoms of dried aluminum cups were coated with Alteco C-350 (epoxy type instantaneous adhesive, trade name, produced by Alpha Gijutsu Kenkyusho). Fifteen minutes later, the compositions C-30 and A-30 were poured respectively into the cups, and allowed to cure by heating under conditions of 150° C. for one hour. The cure state of the surfaces of these compositions in contact with the cup bottoms were examined. Cure was insufficient with the composition C-30, and it could be easily peeled off from the aluminum cup. On the other hand, the composition A-30 was cured completely to a rubber state and firmly bonded to the aluminum cup.

We claim:
1. A curable silicone composition comprising:
   (A) a polyorganosiloxane containing alkenyl groups attached to silicon atoms in the molecule;
   (B) a polyorganosiloxane containing hydrogen atoms attached to silicon atoms in the molecule;
   (C) a catalytic amount of curing catalyst to promote addition reaction; and
   (D) an amine compound represented by the formula:

$$X(CH_2)_n NR^1 R^2$$

wherein X represents a substituted or unsubstituted monovalent aryl group, n represents an integer of 0 to 5, $R^1$ represents a substituted or unsubstituted alkyl group with 1 to 10 carbon atoms or a hydrogen atom, and $R^2$ represents a substituted or unsubstituted alkyl group with 1 to 10 carbon atoms or a monovalent group represented by $Z_3SiQ^1$.

2. The composition according to claim 1 wherein 90 mole % or more of the organic groups, attached to the silicon atoms in component (A), other than alkenyl groups are methyl groups.

3. The composition according to claim 1 wherein the alkenyl group in component (A) is vinyl group.

4. The composition according to claim 1 wherein 90 mole % or more of the organic groups attached to the silicon atoms in component (B) are methyl groups.

5. The composition according to claim 1 wherein the number of hydrogen atoms attached to the silicon atoms in component (B) is 0.1 to 10 per alkenyl group attached to the silicon atoms in component (A).

6. The composition according to claim 1 wherein the curing catalyst in component (C) is a catalyst selected from a group consisting of platinum, platinum compound, palladium, palladium compound, rhodium and rhodium compound.

7. The composition according to claim 1 wherein the curing catalyst in component (C) is platinum or platinum compound catalyst.

8. The composition according to claim 1 wherein the amount of component (C) incorporated is 1 to 500 ppm based on the total amount of components (A) and (B).

9. The composition according to claim 1 wherein $R^1$ in component (D) is hydrogen atom, methyl group or ethyl group.

10. The composition according to claim 1 wherein $R^2$ in component (D) is methyl group, ethyl group or a group represented by $Z_3SiQ^2$ where $Q^2$ represents alkenyl group with 8 or more carbon atoms, cycloalkylene group with 6 or more carbon atoms, arylene group or a substituted group thereof.

11. The composition according to claim 1 wherein the amount of component (D) incorporated is 0.001 to 10 parts by weight per 100 parts by weight of the total amount of components (A) and (B).

12. The composition according to claim 1 wherein component (D) is N,N-dimethylaniline.

* * * * *